(12) United States Patent
Bauer et al.

(10) Patent No.: US 11,986,770 B2
(45) Date of Patent: May 21, 2024

(54) METHOD AND ARRANGEMENT FOR RECOVERING A HELIUM PRODUCT FROM NATURAL GAS BY MEMBRANE UNIT

(71) Applicant: Linde GmbH, Pullach (DE)

(72) Inventors: Martin Bauer, Munich (DE); Konstantinos Rallis, Munich (DE)

(73) Assignee: Linde GmbM, Pullach (DE)

( * ) Notice: Subject to any disclaimer, the term of this patent is extended or adjusted under 35 U.S.C. 154(b) by 651 days.

(21) Appl. No.: 17/266,145

(22) PCT Filed: Aug. 7, 2019

(86) PCT No.: PCT/EP2019/025260
§ 371 (c)(1),
(2) Date: Feb. 5, 2021

(87) PCT Pub. No.: WO2020/035169
PCT Pub. Date: Feb. 20, 2020

(65) Prior Publication Data
US 2021/0291110 A1    Sep. 23, 2021

(30) Foreign Application Priority Data

Aug. 17, 2018 (EP) .................................. 18020392

(51) Int. Cl.
*B01D 53/22* (2006.01)
*B01D 51/10* (2006.01)
(Continued)

(52) U.S. Cl.
CPC ........... *B01D 53/229* (2013.01); *B01D 51/10* (2013.01); *C01B 23/0042* (2013.01);
(Continued)

(58) Field of Classification Search
CPC ...... B01D 53/229; B01D 51/10; B01D 53/02; B01D 2256/18; B01D 2257/11;
(Continued)

(56) References Cited

U.S. PATENT DOCUMENTS 5,632,803 A    5/1997  Stoner et al.
2007/0193303 A1*  8/2007  Hawrysz ................ F25J 1/0294
                                                            62/620
(Continued)

FOREIGN PATENT DOCUMENTS

EP            1808408 A2 *  7/2007  ......... C01B 23/0036

OTHER PUBLICATIONS

Pdf is original document of foreign reference (Year: 2007).*
(Continued)

*Primary Examiner* — Len Tran
*Assistant Examiner* — Kamran Tavakoldavani
(74) *Attorney, Agent, or Firm* — Millen, White, Zelano & Branigan, P.C.; Brion P. Heaney

(57) ABSTRACT

A method for recovering a helium product or intermediate product, wherein a first natural gas stream containing helium is supplied to a first natural gas processing unit and at least one second natural gas stream containing helium is supplied to at least one second natural gas processing unit, at least the first natural gas processing unit comprising helium recovery means via which the helium product is formed from at least a part of the first natural gas stream. At least temporarily a helium transfer from the at least one second natural gas stream to the first natural gas stream by means of a helium transfer arrangement comprising a membrane unit is performed before the first natural gas stream is provided to the first natural gas processing unit and before the at least one second natural gas stream is provided to the at least one second natural gas processing unit.

20 Claims, 1 Drawing Sheet

(51) Int. Cl.
  *B01D 53/02* (2006.01)
  *C01B 23/00* (2006.01)
  *C10L 3/10* (2006.01)
  *F25J 1/00* (2006.01)
(52) U.S. Cl.
  CPC .......... *C01B 23/0052* (2013.01); *C10L 3/101* (2013.01); *F25J 1/0007* (2013.01); *F25J 1/0022* (2013.01); *B01D 53/02* (2013.01); *B01D 2256/18* (2013.01); *C01B 2210/001* (2013.01); *C01B 2210/0014* (2013.01); *C01B 2210/0031* (2013.01); *C01B 2210/007* (2013.01); *C10L 2290/548* (2013.01); *F25J 2205/40* (2013.01)
(58) Field of Classification Search
  CPC ............ C01B 23/0042; C01B 23/0052; C01B 2210/001; C01B 2210/0014; C01B 2210/0031; C01B 2210/007; C10L 3/101; C10L 2290/548; F25J 1/0007; F25J 1/0022; F25J 2205/40
  See application file for complete search history.

(56) References Cited

U.S. PATENT DOCUMENTS

| 2014/0243574 | A1  | 8/2014  | Karode |
| 2016/0231051 | A1* | 8/2016  | Shah ................... C01B 23/0078 |
| 2017/0114294 | A1  | 4/2017  | Florido |
| 2017/0320736 | A1  | 11/2017 | Voss |
| 2018/0363978 | A1* | 12/2018 | Ballaguet ............... C10L 3/101 |
| 2019/0201838 | A1* | 7/2019  | Bikson ............... C01B 23/0042 |

OTHER PUBLICATIONS

H.-W. Haring (Ed.), Industrial Gases Processing, Wiley-VCH, 2006, particularly chapter 4, "The Noble Gas Helium".

"Noble Gasses", Ullmann's Encyclopedia of Industrial Chemistry, online edition 15. Mar. 2001, DOI:10.1002/14356007.a10_045.pub2.

\* cited by examiner

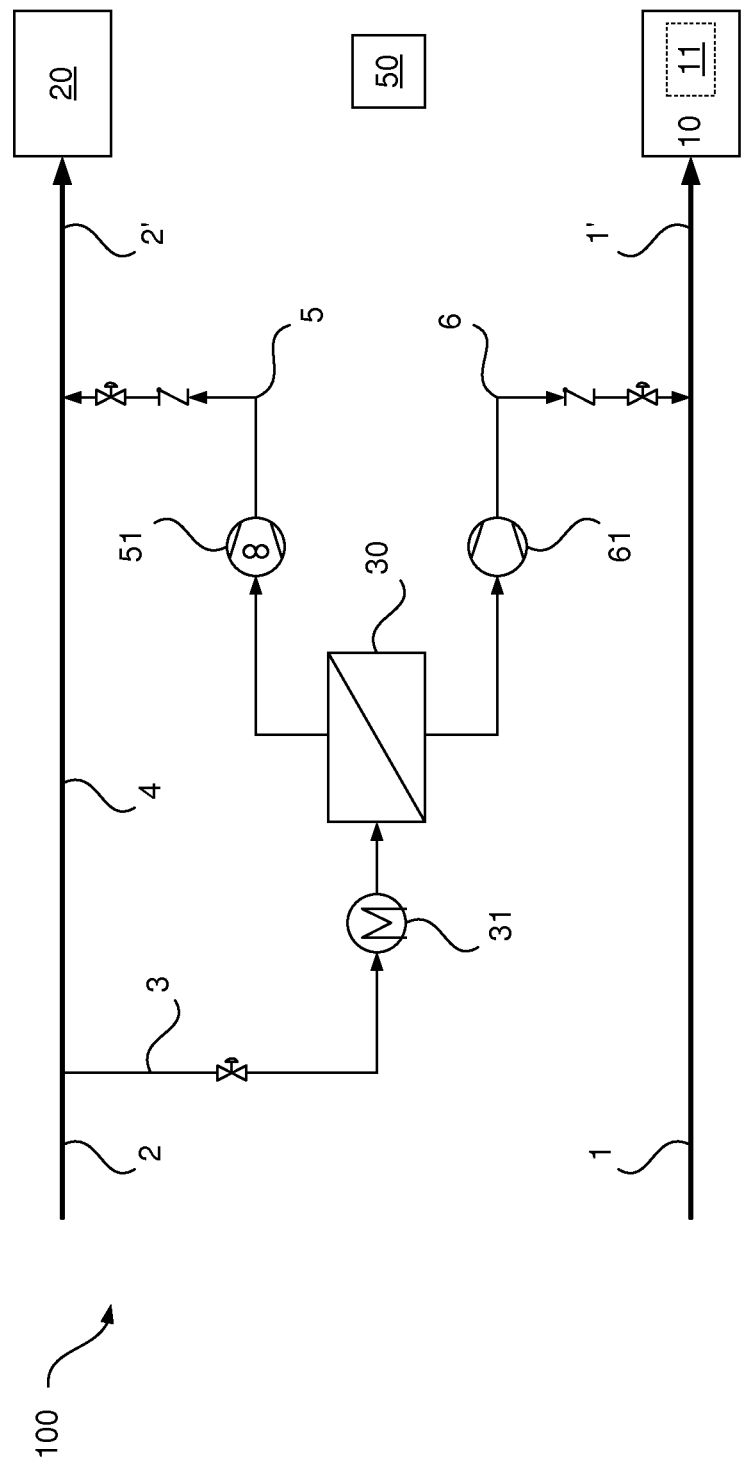

METHOD AND ARRANGEMENT FOR RECOVERING A HELIUM PRODUCT FROM NATURAL GAS BY MEMBRANE UNIT

The present invention relates to a method and to an arrangement for recovering a helium product from natural gas according to the pre-characterizing clauses of the independent claims.

PRIOR ART

Helium is typically recovered from natural gas. In natural gas, helium is usually present at concentrations of up to 1 mole percent. In exceptional cases, the concentrations may be even higher. Helium present in natural gas is formed by radioactive decay. While it is generally possible to recover helium from atmospheric air by means of (cryogenic) air separation, this is usually not considered practical due to the low concentrations of helium in air.

Methods and arrangements for recovering helium from natural gas are known and are e.g. described in H.-W. Haring (Ed.), Industrial Gases Processing, Wiley-VCH, 2006, particularly chapter 4, "The Noble Gas Helium" or in the article "Noble Gases" in Ullmann's Encyclopedia of Industrial Chemistry, online edition 15. Mar. 2001, DOI: 10.1002/14356007.a10_045.pub2. They include cryogenic, membrane-based and combined methods and arrangements.

Helium can e.g. be recovered from natural gas in the course of removing nitrogen from the natural gas before liquefaction. In this context, e.g. apparatus including a so-called high-pressure column and a so-called low-pressure column can be used, as particularly shown in FIG. 4.1 in Häring. These columns are operated at cryogenic temperatures at which carbohydrates condense at the operating pressures used.

Via a corresponding method, so-called raw helium is initially produced. This raw helium is, in order to produce a pure helium product, e.g. subsequently submitted to pressure swing adsorption (PSA). An example is shown in FIG. 4.2 in Häring. Additionally to pressure swing adsorption, temperature swing adsorption (TSA) can be used which is based on the temperature dependency of the adsorption.

If, in the following, reference is made to a "helium product", this term is to be understood to describe a stream which is enriched in helium compared to the natural gas. This helium product could be especially an endproduct which is substantially pure helium or a gas mixture containing 90, 95, 99, 99.5 (so-called helium 2.5), 99.9 (helium 2.93.0), 99.95 (helium 3.5), 99.99 (helium 4.0), 99.995 (helium 4.5), 99.999 (helium 5.0), 99.9995 (helium 5.5), 99.9999 (helium 6.0) or 99.99999 mole percent (helium 7.0) of helium. This helium product could also be a helium intermediate product which contains less helium with 10, 20, 30, 40, 50, 60, 70, 80 mole percent and can optionally be further to yield a helium endproduct. A stream is considered as a helium product, as long as the stream is separated from natural gas and contains more percentage of helium than the natural gas by a recovery means.

In cases where natural gas is not liquefied but e.g. combusted, the helium contained in the natural gas is normally not utilized but vented to the atmosphere in the flue gas. It is the object of the present invention to present a method and an arrangement allowing for an advantageous use of such helium as well.

DISCLOSURE OF THE PRESENT INVENTION

According to the present invention, a method and an arrangement for recovering a helium product from natural gas with the features of the independent claims is provided. Advantageous embodiments of the present invention are the subject of the dependent claims and of the description that follows hereinafter.

Advantages of the Present Invention

According to the present invention, a first natural gas stream containing helium is supplied to a first natural gas processing unit and at least one second natural gas stream containing helium is supplied to at least one second natural gas processing unit, at least the first natural gas processing unit comprising helium recovery means via which the helium product is formed from at least a part of the first natural gas stream. The present invention particularly can relate to cases in which several second natural gas processing units are present. This is especially the case when natural gas is combusted in several second natural gas processing units, as explained below. These may e.g. be connected to a natural gas distribution system. In all cases, one or several second natural gas processing units may be individually supplied with several natural gas streams or they may be supplied with one natural gas stream which is then distributed to the second natural gas processing units. In the context of the present invention, one or more of such (common or individual) natural gas streams may be included and treated as set forth below.

The first natural gas processing unit may, according to the present invention, particularly operate using cryogenic temperatures, i.e. temperatures below −100° C. The first natural gas processing unit may particularly be embodied as a natural gas liquefaction unit providing liquefied natural gas (LNG). The helium recovery means may be particularly part of a nitrogen removal section in such a natural gas liquefaction unit, as described hereinbefore. The second natural gas processing unit(s) may particularly lack corresponding recovery means. The second natural gas processing unit(s) may particularly be adapted to utilize the second natural gas stream by combustion at any scale (including e.g. combustion in powerplants and industrial and domestic heating and firing systems), wherein the helium contained therein is transferred to flue gas. Preferably, the second natural gas processing unit(s) does not contain any means to separate the helium from natural gas to produce a helium product for commercial utilization. The second natural gas stream(s) may e.g. be passed through international or national transfer pipelines.

Preferably, the natural gas streams including both first natural gas and second natural gas are transferred by international or national transfer pipelines which has a distance of at least kilometers from inlet of the natural gas to the outlet to the processing units.

According to the present invention, at least temporarily a helium transfer from the at least one second natural gas stream to the first natural gas stream by means of a helium transfer section comprising a membrane unit is performed before the first natural gas stream is provided to the first natural gas processing unit and before the at least one second natural gas stream is provided to the second natural gas processing unit, whereby the first natural gas stream contains more helium than it before the helium transfer.

The solution according to the present invention allows to utilize at least a part of the helium contained in one or more natural gas streams which is or are normally processed without extracting the helium, e.g. in one or more combustion units like gas turbines or domestic appliances, with a minimum of additional effort. To this purpose, the helium is separated from one or more corresponding natural gas streams (the natural gas stream or streams referred to as the "second" natural gas stream or streams hereinbefore and hereinafter) and transferred to another natural gas stream (the natural gas stream referred to as the "first" natural gas stream hereinbefore and hereinafter) which is supplied to a helium processing unit including helium recovery means, e.g. a helium liquefaction unit, particularly a natural gas liquefaction unit including a nitrogen removal section. Generally, the helium recovery means may be adapted to produce any kind of a "helium product" as specified hereinbefore and may include any means known for this purpose from literature. Even if not specifically explained, helium may also be transferred to several first natural gas streams in the context of the present invention.

Particularly, the present invention allows for decoupling the production rate of a corresponding helium product from the natural gas liquefaction rate at least in part. If e.g. in a corresponding helium liquefaction unit only a fraction of the maximum amount of the liquefied natural gas possible is produced, this would conventionally result in a corresponding smaller amount of helium product to be recovered. According to the present invention, however, the lower amount of helium product can at least in part be compensated by the helium transferred from the other ("second") natural gas stream(s). In other words, as a result of the helium transfer provided according to the present invention, a more constant production rate of the helium product can be assured, independently of the actual natural gas liquefaction rate.

According to the present invention, advantageously the method therefore includes a first mode of operation performed in a first time period and a second mode of operation performed in a second time period not overlapping with the first time period, wherein in the first mode of operation the helium transfer is performed including transferring a first amount of helium from the at least one second gas stream to the first gas stream, and wherein in the second mode of operation the helium transfer is not performed or is performed including transferring a second amount of helium smaller than the first amount of helium from the at least one second gas stream to the first gas stream. By using the higher helium transfer in the first mode of operation, or by using a helium transfer in this first mode of operation and no helium transfer in the second mode of operation, smaller amounts of helium extractable from helium-containing natural gas processed in the first natural gas processing unit can be compensated as just mentioned hereinbefore.

As mentioned, in the first mode of operation, particularly a smaller amount of natural gas is processed in the first natural gas processing unit than is processed in the second mode of operation. The smaller amount may e.g. be by 10%, 20%, 30%, 40% or 50% smaller without substantially impairing an amount of the helium product recovered in the first mode of operation. This corresponds to the advantageous decoupling of the recovery of the helium product from the amount of natural gas processed in the first natural gas processing unit at least in part. In particular there is a control unit provided to vary the total flow rate of the first natural gas in order to provide a same helium flow rate processed in the first natural gas processing unit as it in the second mode of operation.

Particularly, in the first mode of operation and in the second mode of operation an amount of the helium product recovered in the helium recovery means differs by no more than 50%, 40%, 30% or 20%, particularly by no more than 10%. Using the present invention, therefore, demands of downstream arrangements using the helium products can be fulfilled at any time or a constant supply to a customer can be ensured.

According to the present invention, in order to perform the helium transfer, at least one first partial stream and at least one second partial stream may be formed from the at least one second natural gas stream, the at least one first partial stream being provided to the membrane unit, a retentate stream and a permeate stream being formed in the membrane unit, at least a part of the retentate stream being reunited with the at least one second partial stream, and at least a part of the permeate stream being added to the first natural gas stream. Using this solution according to a preferred embodiment of the present invention, a particularly easy transfer may be implemented with little additional cost.

Membrane units for separating gas mixtures are generally known in the art. Such membrane units are supplied with a compressed gas stream ("feed") comprising components for which a membrane in the membrane unit has different permeabilities. In a membrane unit, a "permeate" is formed, comprising predominantly or exclusively components which are not or only to a low extent retained by a corresponding membrane and therefore preferably pass the membrane. A "retentate" correspondingly predominantly or exclusively comprises components which are preferably retained by the membrane of the membrane unit.

Particularly, in the context of the present invention, membranes comprising glassy polymers may be used, e.g. polymers like polyimides, polysulfones or cellulose acetate. Such polymers allow for a particularly advantageous and effective helium recovery because hydrocarbons are to a large extent retained at the high pressure side (i.e. in the retentate), so that the retentate stream which is substantially larger than the permeate stream only has to be slightly compressed to compensate for pressure losses in the membrane unit.

According to the present invention, the at least one first partial stream is provided to the membrane unit at a feed pressure and the permeate stream is withdrawn from the membrane unit at a permeate pressure, wherein a pressure ratio between the feed pressure and the permeate pressure is advantageously at least 5, particularly at least 8 Such pressure ratios allow for a particularly effective recovery of helium. Furthermore, the retentate stream is according to the present invention withdrawn from the membrane unit at a retentate pressure, a pressure difference between the feed pressure and the retentate pressure being particularly not more than 2 bar, preferable not more than 1.5 bar.

Advantageously, the membrane unit is operated with a yield of 40% to 90%, preferably with a yield of 60% to 80%, the yield denoting a ratio of the helium content in the permeate stream of the membrane and the feed. According to the present invention, therefore, it is not necessary to recover all helium in the natural gas stream(s) supplied to the membrane unit, i.e. the at least one first partial stream. A corresponding membrane unit may therefore be provided and operated at lower cost. In particular, the membrane unit consists only one stage membrane. It is particularly advantageous to choose the said yield range for operation of the membrane unit which not only recoverys the helium in a proper amount which fulfills the requirement of the first natural gas processing unit, but at the same time reduces the cost of the membrane as much as possible and such to provide a cost-effective membrane unit to resolve the problem of wasting helium.

According to the present invention, the at least one first partial stream may be subjected to pretreatment before being provided to the membrane unit according to the requirements of the membrane unit. Particularly, the pretreatment may include filtering, heating and/or cooling of and/or adsorption of unwanted components from the at least one first partial stream. Particularly, a heating and/or cooling step may be included to compensate for daily and/or seasonal temperature cycles.

According to the present invention, the first natural gas stream and/or the at least one second natural gas stream are provided at a pressure of 10 to 120 bar, preferable from to 90 bar. Before the retentate stream is at least in part reunited with the at least one second natural gas stream, it may be recompressed to the pressure of the at least one second natural gas stream. By selecting the operating conditions of the membrane units and/or the membranes used, as mentioned, such a recompression may be kept to a minimum according to the present invention. A separate recompression of the retentate can also completely be dispensed with if a compressor or several compressors compressing the at least one second natural gas stream is or are able to compensate a corresponding pressure loss. This is particularly possible if the membrane unit is placed in a close distance to a corresponding compressor or corresponding compressors.

The permeate stream, before being at least in part united with the first natural gas stream, is advantageously also compressed to the pressure of the first natural gas stream. In all cases, it is of particular advantage if the membrane unit is installed in a close distance to a compressor or compressors compressing the first and the at least one second natural gas stream. Furthermore, it is of particular advantage if arrangement is made which minimizes the distance of helium transport between the two streams.

As mentioned before, the first natural gas processing unit is particularly operated at least in part at a cryogenic temperature and is particularly a natural gas liquefaction unit providing liquefied natural gas. As also mentioned, the second natural gas stream may be combusted in the second natural gas processing unit without extracting the helium therein.

The present invention also relates to an arrangement for recovering a helium product, the arrangement including a first natural gas processing unit and at least one second natural gas processing unit, means adapted to supply a first natural gas stream containing helium to the first natural gas processing unit and at least one second natural gas stream containing helium to the at least one second natural gas processing unit, at least the first natural gas processing unit comprising helium recovery means adapted to form the helium product from at least a part of the first natural gas stream. According to the present invention, a helium transfer section comprising a membrane unit is provided, the helium transfer section being adapted to perform at least temporarily a helium transfer from the at least one second natural gas stream to the first natural gas stream before the first natural gas stream is provided to the first natural gas processing unit and before the at least one second natural gas stream is provided to the at least one second natural gas processing unit, whereby the first natural gas stream is enriched in helium and whereby the at least one second natural gas stream is depleted in helium.

As to further features and advantages of an inventive arrangement and its possible embodiments, particular reference is made to the description of the method according to the present invention and its embodiments as described before. An arrangement according to the present invention is particularly adapted to perform a corresponding method or an embodiment thereof.

The present invention will further be described with reference to the appended drawing illustrating an embodiment of the present invention.

BRIEF DESCRIPTION OF THE DRAWING

FIG. 1 illustrates an arrangement according to an embodiment of the invention.

DETAILED DESCRIPTION OF THE DRAWING

FIG. 1 schematically illustrates an arrangement 100 according to an embodiment of the invention in form of a simplified process diagram. The following explanations likewise relate to a corresponding method.

In the arrangement 100, a first natural gas stream 1 containing helium is supplied to a first natural gas processing unit 10 as described before, e.g. to a natural gas liquefaction unit, and a second natural gas stream 2 containing helium is supplied to a second natural gas processing unit 20, e.g. including a gas turbine. At least the first natural gas processing unit 10 comprises helium recovery means 11 via which the helium product is formed from at least a part of the first natural gas stream 1. For further details, reference is made to the explanations above.

In the arrangement 100, at least temporarily a helium transfer from the second natural gas stream 2 to the first natural gas stream 1 by means of a helium transfer arrangement comprising a membrane unit 30 is performed before the first natural gas stream 1 is provided to the first natural gas processing unit 10 and before the second natural gas stream 2 is provided to the second natural gas processing unit 20, whereby the first natural gas stream 1 is enriched in helium and whereby the second natural gas stream 2 is depleted in helium.

For this helium transfer, at least a first partial stream 3 and a second partial stream 4 are formed from the second natural gas stream 2, the first partial stream 3 being provided to the membrane unit 30, a retentate stream 5 and a permeate stream 6 being formed in the membrane unit 30, at least a part of the retentate stream 5 being reunited with the second partial stream 2, and at least a part of the permeate stream 6 being added to the first natural gas stream 1. The streams formed correspondingly are indicated with 2' and 1' in FIG. 1.

Before being supplied to the membrane unit 30, the first partial stream 3 is subjected to a pretreatment. In the example illustrated, it is heated in a heater 31. The retentate stream 5 and the permeate stream 6 are recompressed, in the example illustrated, in a blower 51 and a compressor 61, respectively.

A control unit 50 is adapted to perform a first mode of operation performed in a first time period and a second mode of operation performed in a second time period not overlapping with the first time period, wherein in the first mode of operation the helium transfer is performed including transferring a first amount of helium from the second gas stream 2 to the first gas stream 1, and wherein in the second mode of operation the helium transfer is not performed or is performed including transferring a second amount of helium smaller than the first amount of helium from the second gas stream 2 to the first gas stream 1.

The two modes of operation (Mode 1, Mode 2) of the method are subsequently illustrated in an example, wherein the term "total flow rate" (refers to a flow rate of the whole gas mixture of a corresponding stream and the term "helium flow rate" refers to the helium content thereof. The denotation of the streams corresponds to FIG. 1. Figures are given in standard cubic meters.

| Stream | 2 | 2' | 3 | 5 | 6 | 1 | 1' |
|---|---|---|---|---|---|---|---|
| Mode 2 | | | | | | | |
| Total flow rate | 100,000 | 100,000 | — | — | — | 100,000 | 100,000 |
| Helium flow rate | 500 | 500 | — | — | — | 500 | 500 |
| Mode 1 | | | | | | | |
| Total flow rate | 104,444 | 100,000 | 55,560 | 51,116 | 4,444 | 55,556 | 60,000 |
| Helium flow rate | 522.2 | 300.0 | 277.8 | 55.6 | 222.2 | 277.8 | 500 |

The invention claimed is:

1. A method for recovering a helium product comprising:
    supplying a first natural gas stream (1) containing helium to a first natural gas processing unit (10),
    supplying at least one second natural gas stream (2) containing helium is to at least one second natural gas processing unit (20),
    wherein at least the first natural gas processing unit (10) comprises helium recovery means (11) via which helium product is formed from at least a part of the first natural gas stream (1),
    at least temporarily transferring helium from the at least one second natural gas stream (2) to the first natural gas stream (1) before the first natural gas stream (1) is supplied to the first natural gas processing unit (10) and before the at least one second natural gas stream (2) is supplied to the at least one second natural gas processing unit (20), and
    wherein the transferring of helium is carried out by a helium transfer arrangement comprising a membrane unit (30) wherein at least a portion of the at least one second natural gas stream (2) is sent to the membrane unit (30) and the membrane unit removes helium from the at least one second natural gas stream (2) and the removed helium is transferred to the first natural gas stream (1).

2. The method according to claim 1, wherein said method includes a first mode of operation and second mode of operation, and said first mode of operation is performed in a first time period and said second mode of operation is performed in a second time period not overlapping with the first time period, and
    wherein in the first mode of operation helium transfer includes transferring a first amount of helium from the at least one second gas stream (2) to the first gas stream (1), and in the second mode of operation helium transfer is not performed or includes transferring a second amount of helium smaller than the first amount of helium from the at least one second gas stream to the first gas stream.

3. The method according to claim 2, wherein in the first mode of operation a smaller amount of natural gas is processed in the first natural gas processing unit (10) than is processed in the second mode of operation.

4. The method according to claim 2, wherein, in the first mode of operation and in the second mode of operation, an amount of helium product recovered in the helium recovery means (11) differs by no more than 50%.

5. The method according to claim 1, wherein, for helium transfer, at least one first partial stream (3) and at least one second partial stream (4) are formed from the at least one second natural gas stream (2), the first partial stream (3) is provided to the membrane unit (30), a retentate stream (5) and a permeate stream (6) are formed in the membrane unit (30), at least a part of the retentate stream (5) is reunited with the at least one second partial stream (2), and at least a part of the permeate stream (6) added to the first natural gas stream (1).

6. The method according to claim 5, wherein the first partial stream (3) is provided to the membrane unit (30) at a feed pressure and wherein the permeate stream (6) is withdrawn from the membrane unit (30) at a permeate pressure, and wherein the pressure ratio between the feed pressure and the permeate pressure is at least.

7. The method according to claim 5, wherein the membrane unit (30) is operated with a yield of 40% to 90%, wherein yield is defined as a ratio of helium content in the permeate stream (6) to helium content in the first partial stream (3).

8. The method according to claim 5, wherein the first partial stream (3) is subjected to pretreatment before being provided to the membrane unit (30).

9. The method according to claim 8, wherein the pretreatment includes filtering, heating, cooling, and/or adsorption of unwanted components.

10. The method according to claim 1, wherein the first natural gas stream (1) and/or the second natural gas stream (2) are provided at a pressure of to 120 bar.

11. The method according to claim 1 wherein the first natural gas processing unit (10) is operated at least in part at a cryogenic temperature.

12. The method according to claim 11, wherein the first natural gas processing unit (10) is a natural gas liquefaction unit providing liquefied natural gas.

13. The method according to claim 1, wherein the at least one second natural gas stream (2) is combusted in the at least one second natural gas processing unit (20).

14. The method according to claim 5, wherein the first partial stream (3) is provided to the membrane unit (30) at a feed pressure and wherein the permeate stream (6) is withdrawn from the membrane unit (30) at a permeate pressure, and wherein the pressure ratio between the feed pressure and the permeate pressure is at least 8.

15. The method according to claim 5, wherein the membrane unit (30) is operated with a yield of between 60% to 80%, wherein yield is defined as a ratio of helium content in the permeate stream (6) to helium content in the first partial stream (3).

16. The method according to claim 5, wherein the first partial stream (3) is provided to the membrane unit (30) at a feed pressure and wherein the permeate stream (6) is withdrawn from the membrane unit (30) at a permeate pressure, and the pressure difference between the feed pressure and the permeate pressure is not more than 2 bar.

17. The method according to claim 5, wherein the first partial stream (3) is provided to the membrane unit (30) at a feed pressure and wherein the permeate stream (6) is withdrawn from the membrane unit (30) at a permeate pressure, and the pressure difference between the feed pressure and the permeate pressure is not more than 1.5 bar.

18. An arrangement for recovering a helium product, comprising:
- a first natural gas processing unit (10) and at least one second natural gas processing unit (20),
- means for supplying a first natural gas stream (1) containing helium to the first natural gas processing unit (10), and means for supplying at least one second natural gas stream (2) containing helium to the at least one second natural gas processing unit (20),
- at least the first natural gas processing unit (10) comprising helium recovery means (11) for forming the helium product from at least a part of the first natural gas stream (1), and
- a helium transfer section comprising a membrane unit (30), the helium transfer section at least temporarily performs a helium transfer from the at least one second natural gas stream (2) to the first natural gas stream (1) before the first natural gas stream (1) is provided to the first natural gas processing unit (10) and before the at least one second natural gas stream (2) is provided to the at least one second natural gas processing unit (20), wherein during the helium transfer the membrane unit removes helium from the at least one second natural gas stream (2) and the removed helium is transferred to the first natural gas stream (1).

19. The arrangement according to claim 18, wherein the membrane unit contains only one membrane stage which provides a helium yield of 40% to 90%, wherein yield is defined as a ratio of helium content in the permeate stream (6) to helium content in the first partial stream (3).

20. The arrangement according to claim 18, wherein the membrane unit contains only one membrane stage which provides a helium yield of 60% to 80%, wherein yield is defined as a ratio of helium content in the permeate stream (6) to helium content in the first partial stream (3).

* * * * *